US010502925B2

(12) United States Patent
Mistkawi

(10) Patent No.: US 10,502,925 B2
(45) Date of Patent: Dec. 10, 2019

(54) DEVICE FOR ACQUIRING OPTICAL INFORMATION

(71) Applicant: Datalogic IP Tech S.r.l., Lippo di Calderara di Reno (IT)

(72) Inventor: Joseph Mistkawi, Bologna (IT)

(73) Assignee: DATALOGIC IP TECH S.R.L., Lippo di Calderara di Reno (BO) (IT)

( * ) Notice: Subject to any disclaimer, the term of this patent is extended or adjusted under 35 U.S.C. 154(b) by 0 days.

(21) Appl. No.: 15/467,823

(22) Filed: Mar. 23, 2017

(65) Prior Publication Data
US 2017/0276901 A1    Sep. 28, 2017

(30) Foreign Application Priority Data

Mar. 25, 2016   (IT) .......................... UA2016A002022

(51) Int. Cl.
| | |
|---|---|
| G02B 7/02 | (2006.01) |
| G02B 7/10 | (2006.01) |
| G06K 7/14 | (2006.01) |
| G02B 7/00 | (2006.01) |
| G02B 7/04 | (2006.01) |
| G06K 7/10 | (2006.01) |

(52) U.S. Cl.
CPC ............ *G02B 7/10* (2013.01); *G02B 7/004* (2013.01); *G02B 7/023* (2013.01); *G02B 7/04* (2013.01); *G06K 7/10831* (2013.01); *G06K 7/1413* (2013.01); *G06K 7/1417* (2013.01)

(58) Field of Classification Search
CPC . G02B 7/04; G02B 7/10; G02B 7/102; G06K 7/14
USPC ................................................. 359/819–830
See application file for complete search history.

(56) References Cited

U.S. PATENT DOCUMENTS

| | | |
|---|---|---|
| 5,818,023 A | 10/1998 | Meyerson et al. |
| 5,966,248 A | 10/1999 | Kurokawa et al. |
| (Continued) | | |

FOREIGN PATENT DOCUMENTS

| | | |
|---|---|---|
| GB | 2333852 A | 8/1999 |
| JP | H04195010 A | 7/1992 |
| (Continued) | | |

OTHER PUBLICATIONS

Search Report and Opinion dated Mar. 25, 2016 for Italian Patent Application No. ITUA20162022, 8 pages.

*Primary Examiner* — Mahidere S Sahle
(74) *Attorney, Agent, or Firm* — Stoel Rives LLP

(57) ABSTRACT

The present disclosure describes a device (10) for the acquisition of optical information, in one embodiment including an external case (11) and, within the case (11), an optical module (20) including an optical focusing group (21) having an optical axis (X). The device (10) may further include, within the case (11), a mechanical actuator (50) associated with the optical focusing group (21) and configured in such a way as to move the optical focusing group (21) along the optical axis (X). The mechanical actuator (50) may include a gripping member (51) of the optical focusing group (21) arranged externally with respect to the optical module (20) and associated with the optical focusing group (21) on opposite sides with respect to the optical axis (X). The gripping member (51) can be moved along a direction parallel to the optical axis (X) such as by way of a control member (70) extending coaxially to the optical axis (X) and operatable in rotation around the optical axis (X) from the outside of the case (11).

20 Claims, 4 Drawing Sheets

(56) References Cited

U.S. PATENT DOCUMENTS

| | | |
|---|---|---|
| 6,618,211 B2 | 9/2003 | Yumiki et al. |
| 9,007,519 B2 | 4/2015 | Iida |
| 9,182,356 B2 | 11/2015 | Nagoshi |
| 2005/0094992 A1 | 5/2005 | Hamasaki et al. |
| 2006/0175411 A1 | 8/2006 | Itou |
| 2011/0188136 A1 | 8/2011 | Lo |

FOREIGN PATENT DOCUMENTS

| | | |
|---|---|---|
| JP | 4775013 B2 | 9/2011 |
| JP | 2012123025 A | 6/2012 |

DEVICE FOR ACQUIRING OPTICAL INFORMATION

The field of the present invention relates to a device for the acquisition of optical information, or more particularly to a device for the acquisition of optical information that may be equipped with a mechanism for the manual adjustment of the focusing distance of a beam of laser light emitted from the device.

With regard to this description and the subsequent claims, the expression "acquisition of optical information" is meant to indicate the acquisition of information concerning an object (for example, distance, volume, footprint, its identifying data, or its characteristics) by means of the acquisition and elaboration of a light signal diffused by the same object. The expression: "optical information" is used in the broadest sense and includes optical codes, but also, more generally, images containing suitable characteristics for the identification and/or selection of an object, for example, on the basis of its shape and/or volume.

The expression: "optical code" is meant to indicate any graphical representation that has the function of storing encoded information. A particular example of an optical code comprises linear or two-dimensional codes, wherein information is encoded using appropriate combinations of fixed form elements, such as squares, rectangles or hexagons, of a dark color (usually black) separated by light colored elements (spaces, normally white), such as bar codes, stacked codes and two-dimensional codes in general, color codes etc. The expression "optical code" also includes, more generally, other graphical forms with an information encoding function, including clear printed characters (letters, numbers, etc.) and particular forms ("patterns") (such as stamps, logos, signatures, fingerprints, etc.). The expression "optical code" also includes detectable graphical representations, not only in the visible light field but also in the range of wavelengths between infrared and ultraviolet.

For ease of discussion, in the following text explicit reference will be made to optical code readers, commonly referred to as: scanners. The adjustment mechanism according to certain embodiments however may also be used in devices of different types such as optical image sensors (vision sensors, smart cameras) for the recognition of objects by means of detecting the features thereof regarding shape or dimensions, and generally for artificial vision applications such as object quality control in industrial processes.

Typically, optical bar code readers include an optical module that contains all (or most) of the mechanical, optical and electronic components necessary for the detection and reading of an optical code. These components may include, amongst others, an emission source of a laser light beam, an optical focusing group of the light beam diffused by the illuminated optical code and an optical group for detecting the beam of light diffused by the optical code and collected by the optical focusing group.

The optical focusing group typically includes at least a lens or a focusing mirror and is designed to focus the beam of light at a fixed focusing distance corresponding to the distance between the optical focusing group and the optical detection group.

As is known, the maximum resolution of an optical code reader, i.e., the minimum dimension of those particular parts it can discern, is related to the diameter of the light beam at that distance wherein the light beam diffused by the illuminated optical code is focused.

For a vast range of applications, the focusing distance, namely the distance at which it is required to focus the beam of light diffused by the illuminated optical code, is not preset. In such a case, it is beneficial to use devices that are capable of adjusting the focusing distance, such as to be able to extend the area within which maximum resolution can be obtained.

Adjusting the focusing distance is known by manually moving the optical focusing group with respect to the optical detection group along the optical axis of the optical focusing group (hereinafter also the "optical axis of the reader").

Some examples of focusing devices of the type discussed above are described in JP 4775013 and U.S. Pat. No. 9,007,519. In such devices, movement of the optical focusing group is obtained by acting manually, by means of a dedicated screwdriver, on the head of an adjusting screw engaged in a threaded insert integrated into an element that supports the optical focusing group. The item moves along the optical axis of the reader as a result of the manual rotation of the adjustment screw, consequently moving the optical focusing group. In JP 4775013, the adjustment screw is extended parallel to the optical axis of the reader, while in U.S. Pat. No. 9,007,519 the adjusting screw is extended perpendicularly to the optical axis of the reader.

The present inventor has observed that in the devices described above, as a result of the manual rotation of the adjustment screw, the optical focusing group is subjected to a high degree of torque that tends, during movement of the latter, to alter the optical alignment between the optical detection group and the optical focusing group. The present inventor has thus recognized that it is desirable to provide appropriate constructive measures in order to counteract the aforementioned torque and retain the desired optical alignment.

The present inventor has recognized a technical problem underlying these optical devices is that of minimizing, and preferably eliminating, the aforementioned torque.

A preferred embodiment relates to a device for the acquisition of optical information, comprising an external case and, within said external case:
  an optical module comprising an optical focusing group of a light beam, said optical focusing group having an optical axis;
  a mechanical actuator that is associated with the optical focusing group and configured to move the optical focusing group along said optical axis;
  wherein said mechanical actuator comprises:
  a gripping member of the optical focusing group arranged externally with respect to the optical module and associated with the optical focusing group on opposing sides with respect to said optical axis;
  a control member for controlling the movement of the gripping member along a direction parallel to said optical axis;
  wherein the control member extends coaxially to said optical axis and operatable in rotation around said optical axis from the outside of said external case.

In a device according to a preferred embodiment, the provision of axial alignment between the optical focusing group and the control member, together with the fact that the movement of the optical focusing group takes place due to the effect of a pushing action exerted upon the optical focusing group on opposing sides with respect to the optical axis, minimizes the torsional stresses to which the optical focusing group is submitted during movement of the latter following the operation of the control member. In this way, maintaining the desired optical alignment may be assured during adjustment of the focusing distance, without the need for additional constructive measures.

The maintaining of the aforementioned optical alignment may be further achieved by an arrangement according to an embodiment whereby the pushing action applied to the optical focusing group is external to the optical module. The adjustment of the focusing distance may therefore be achieved without the need to provide any structural component within the optical module other than those required, and typically provided, for the reading of optical codes. It is therefore possible to use within the device according to a preferred embodiment conventional optical modules and/or pre-assembled optical modules, without altering the optical alignment defined during the design and/or initial calibration stages. There may also be no need to provide openings or holes in conventional or pre-assembled optical modules, thus avoiding the need to compromise any required sealing with respect to the outside environment.

Additionally, the ability to manually control the axial movement of the optical focusing group from the outside of the external case makes it extremely easy to adjust the focusing distance. The user can in fact have an immediate and easy visual indication of the adjustment performed.

A preferred embodiment may comprise the characteristics discussed hereinafter, which can be taken individually or in combination.

The gripping member may comprise a pair of arms, that may preferably extend symmetrically with respect to the optical axis. Such a device makes it possible to completely cancel the torsional stresses to which the optical focusing group is submitted when adjusting the focusing distance.

The arms may stretch mainly along respective directions that are parallel to said optical axis. In this way, it is possible to limit the overall height of the external case of the device, which in practice is only slightly higher than the optical module contained therein.

Each of the arms may be substantially C-shaped and comprises, at a free end portion thereof, a fastening wall at an end flange of the optical focusing group and, at an opposite end portion thereof, a wall for the coupling to the control member.

In certain preferred embodiments, the fastening wall may be held in axial abutment against the end flange of the optical focusing group by a clamping screw that is screwed into a threaded hole formed in the fastening wall and having a head in abutment against said end flange on the opposite side with respect to the fastening wall. In this way, the required firm anchoring between said arms and the optical focusing group is obtained.

In an embodiment, the fastening wall and coupling wall extend substantially perpendicularly to said optical axis. In this way, the axial extension of the arms is contained, which arms, in practice, are only slightly longer than the optical module.

In preferred embodiments of the present invention, each of said arms is connected to the other arm by means of a connecting arm coupled to the control member and made as one piece with the coupling walls. This measure makes it possible to ensure the simultaneous movement of the two arms.

In certain embodiments, the external case comprises, therewithin, a PCB, that supports the optical module and one of said arms, which is interposed between the optical module and the PCB and comprises a projecting sliding element housed within a sliding seat formed within the PCB. The coupling between the projecting element and the sliding seat makes it possible to guide the sliding of the optical focusing group along the optical axis.

The PCB may be folded in C form. Once folded in C form, a portion of the base of the PCB acts as a support plate for the optical module.

In a embodiment, the control member comprises:
 a threaded insert that is integral to the gripping member and arranged coaxially to said optical axis;
 an adjustment screw that is engaged within the threaded insert;
 a control member for controlling the rotation of the adjustment screw, wherein the control member is integral to the adjustment screw and arranged externally to said external case.

The axial movement of the optical focusing group is then performed by means of a screw-threaded insert. This coupling makes it possible to perform fine adjustments of the focusing distance. The action from the outside of the case facilitates the actions of the user Preferably the threaded insert may be integral to said connecting arm. More preferably, the threaded insert may be housed within a hole formed in said connecting arm, coaxially to the optical axis.

Preferably, the control element may be arranged coaxially to the optical axis.

More features and benefits of the device of the present invention will become more evident from the following detailed description of the preferred embodiments thereof, by way of an illustrative and non-limiting example with reference to the enclosed drawings. In said drawings.

Figure 1:
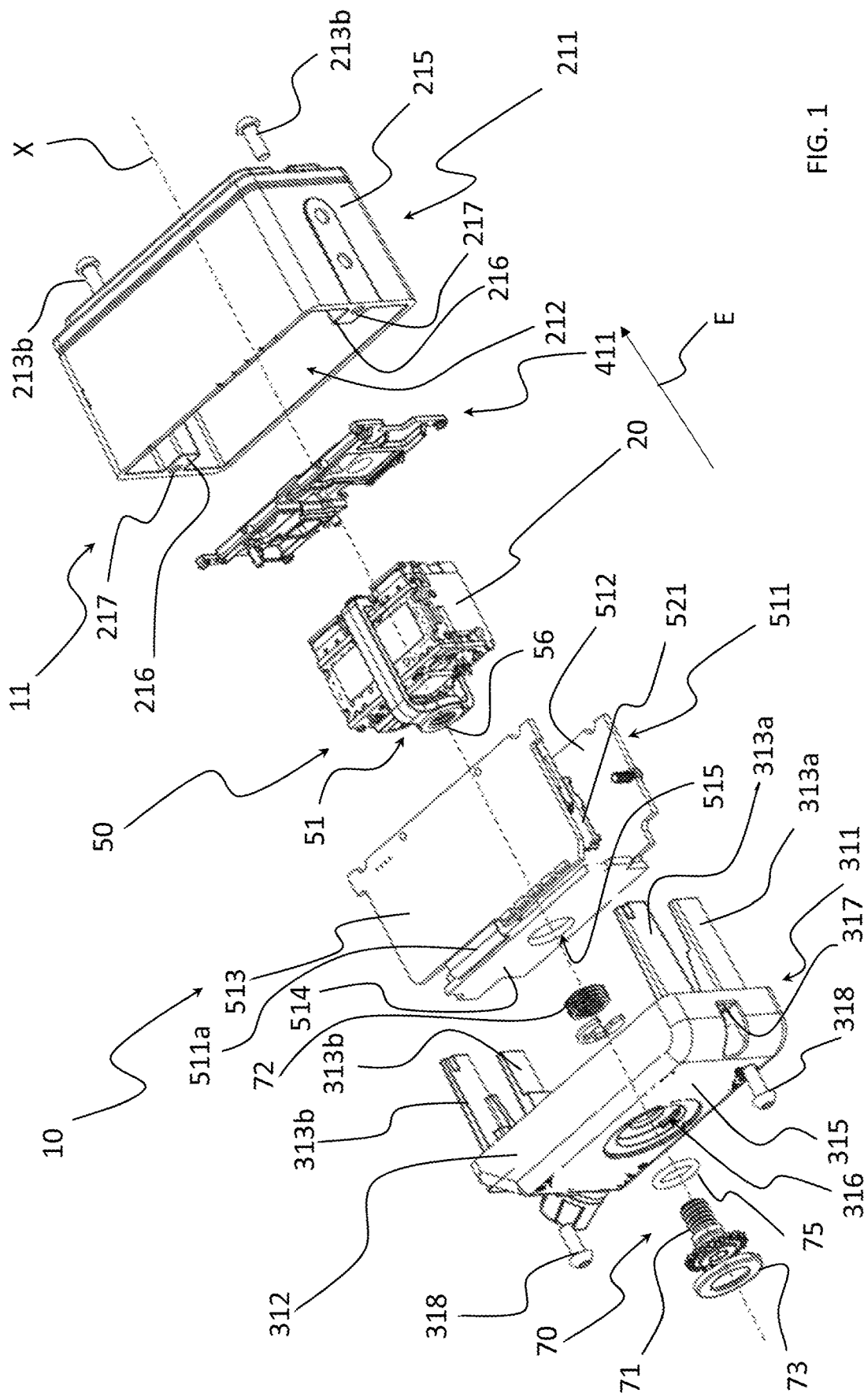
FIG. 1 is an exploded isometric schematic view of a device according to an embodiment.
Figure 2:
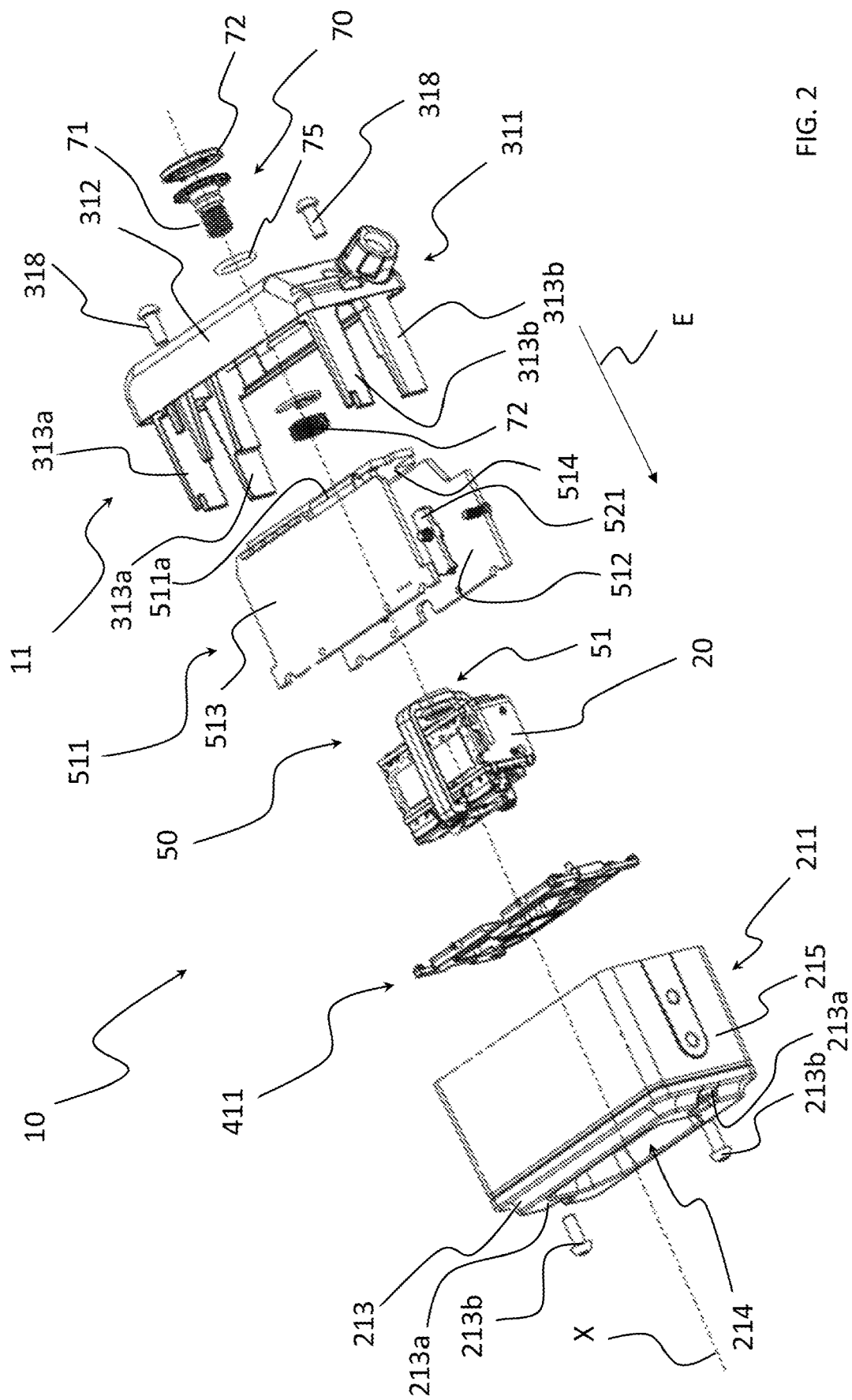
FIG. 2 is an exploded isometric schematic view of the device of FIG. 1 from an observationally different point of view.

In FIGS. 1 and 2, with the numeric reference 10 there is an optical information acquisition device according to an embodiment. Hereinafter, reference shall be made to the device 10 referring to it also as a "reading device".

The reading device 10 comprises an external case 11 within which an optical module 20 is housed that may contain all of the mechanical, optical and electronic components necessary for the reading of optical codes.

In particular, the optical module 20 comprises, in the specific example illustrated here, a pair of light sources 15 (FIG. 3) that are intended to illuminate an optical code to be read (not shown). The direction of emission of the beam of light emitted by the light sources 15 is indicated in the various figures with the letter E.

Figure 3:
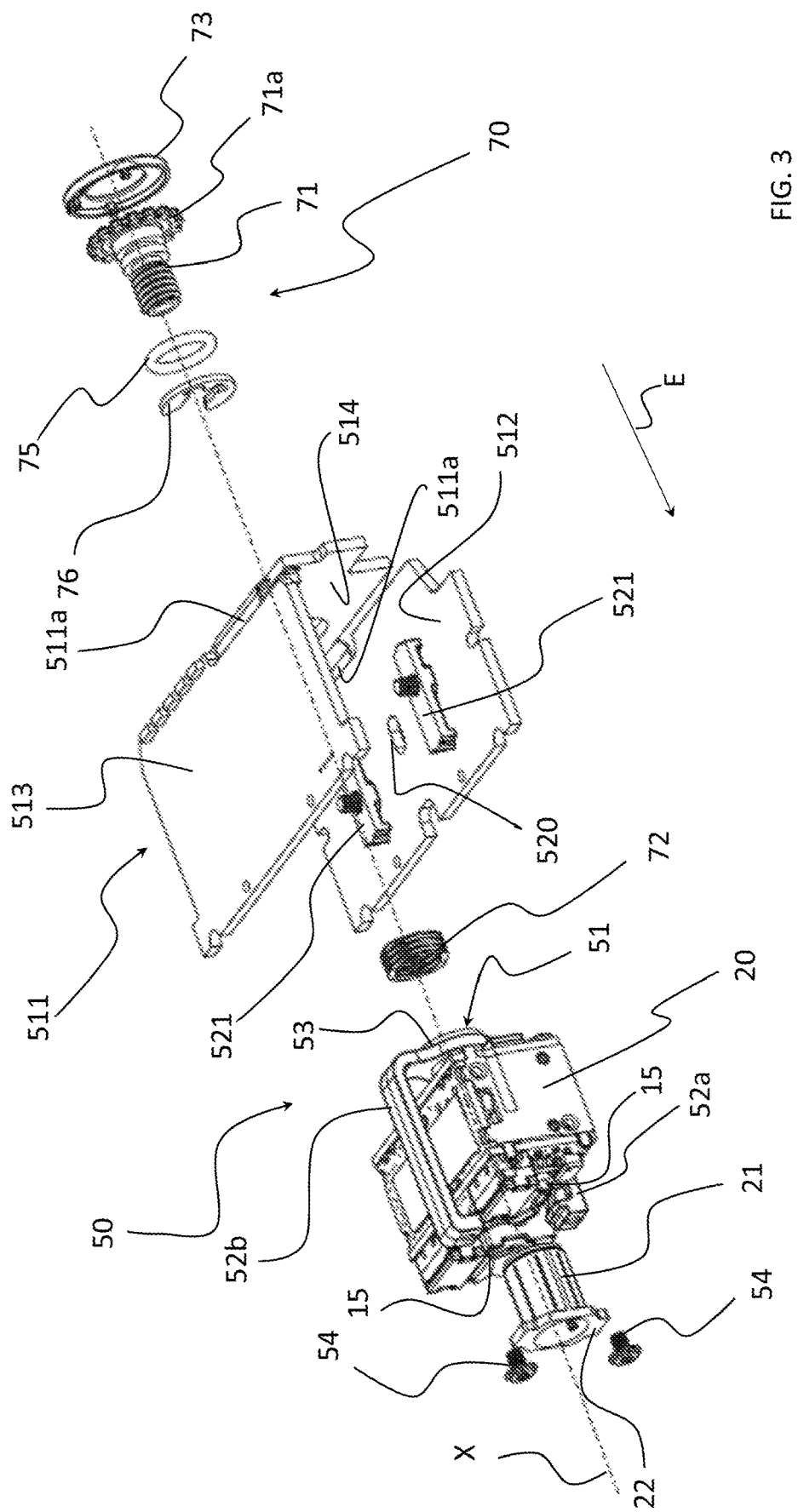
FIG. 3 is an exploded enlarged isometric schematic view of a part of the device of FIG. 1.
Figure 4:
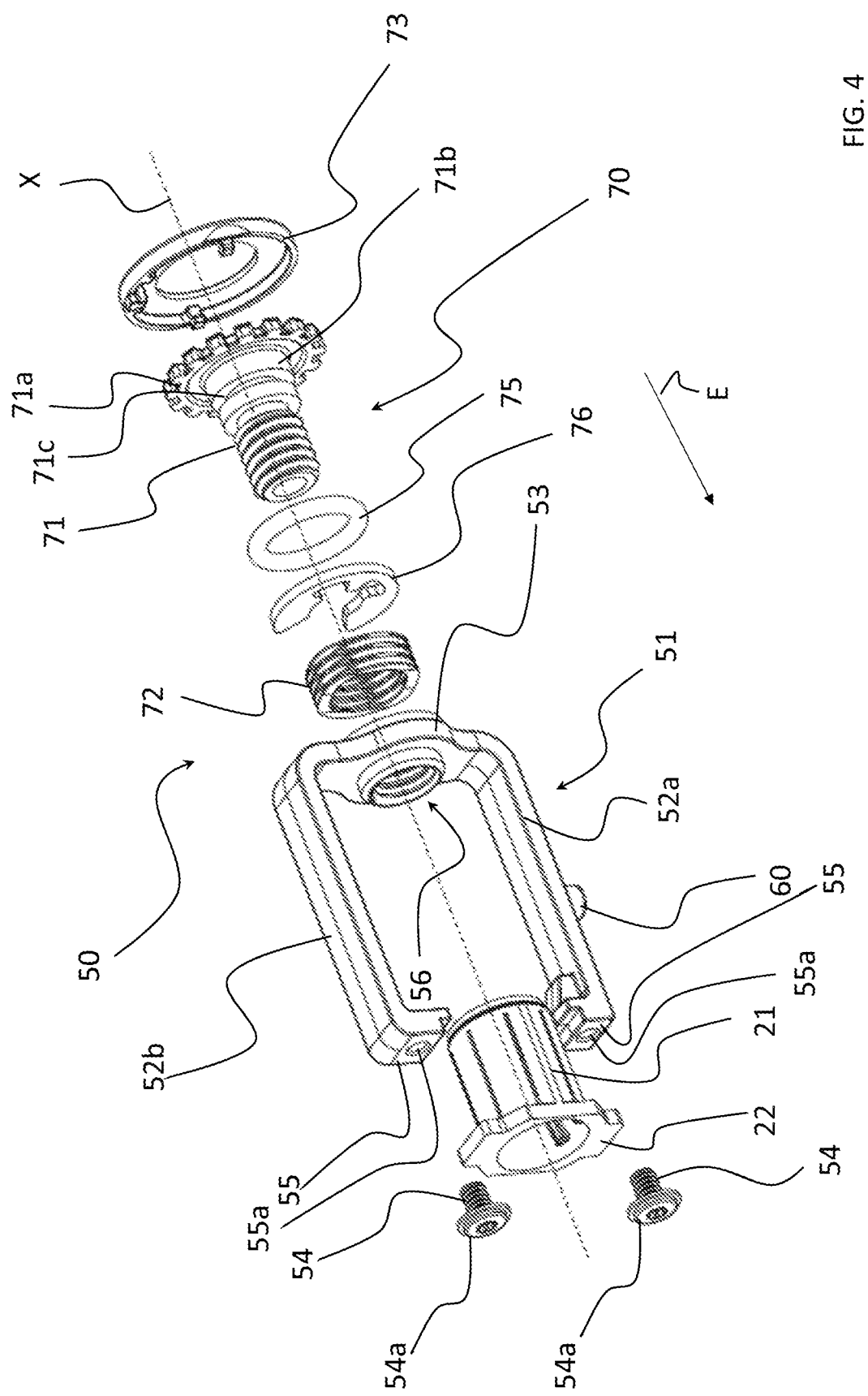
FIG. 4 is an exploded enlarged isometric schematic view of a part of the mechanical actuator used in the device illustrated in the previous figures for adjusting the focusing distance.

The optical module 20 further comprises an optical focusing group 21 with an optical axis (X) and an end flange 22 (FIGS. 3 and 4). In the specific example illustrated here, the optical focusing group 21 is interposed between the light sources 15.

The optical focusing group 21 collects the light diffused by the optical code illuminated by the light sources 15.

The optical module 20 also comprises an optical group for detecting the light beam focused by means of the optical focusing group 21. The optical detection group, which is not shown in the attached figures, comprises in particular an image sensor that lies in a plane perpendicular to the optical axis X and in optical alignment with the optical focusing group 21.

In the example illustrated here, the external case 11 includes a box-shaped body 211 and a mutually coupled cover or lid 311.

The box-shaped body 211 has a substantially parallelepiped form and houses therein the optical module 20.

The box-shaped body 211 has a face 212 (FIG. 1) that is open to allow for the insertion of the optical module 20. On the face opposite the box-shaped body 211 there is associated a frame 213 (FIG. 2) provided with a reading window 214 through which the light beam emitted by the light sources 15 exits and through which the light beam of diffused by the illuminated optical code enters.

Formed on the frame 213, on opposing sides with respect to the reading window 214, there are respective through holes 213a for fixing the frame 213 onto the box-shaped body 211 by means of appropriate screws 213b.

The box-shaped body 211 has, furthermore, on the inner surface of two opposing side walls 215 thereof, respective thickened portions 216 having a parallelepiped form wherein respective threaded holes 217 are obtained (FIG. 1).

The cover 311 is coupled to the box-shaped body 211 at the face 212 of the latter.

The cover 311 comprises a main body 312 wherefrom two opposing pairs of fins 313a, 313b protrude, which fit the box-shaped body 211 in such a way that each thickened portion 216 is interposed between a respective pair of fins 313a, 313b. The fins of each pair of fins 313a, 313b have planar facing surfaces in order to allow for the scrolling of the fins 313a, 313b upon the thickened portions 216 when the lid 311 is coupled to the box-shaped body 211.

The main body 312 comprises a front wall 315 (FIG. 1) whereupon a central through hole 316 and, on opposite sides to the central hole 316, respective through holes 317 aligned with the threaded holes 217 and intended to receive screws 318 for clamping the cover 311 on the box-shaped body 211 are formed.

The central hole 316 is coaxial to the optical axis X.

The reading device 10 further comprises a mask 411 housed within the box-shaped body 211. In FIG. 3 the mask 411 is not shown.

The mask 411 has openings to allow for the passage of the beam of light emitted by the light sources 15 and by the beam of light diffused by the illuminated optical code and is configured in such a way as to screen the aforesaid beams of light with respect to one another, thus preventing spurious radiation belonging to the beam of light emitted by the light sources 15 unintentionally being collected by the focusing device 21 before leaving the optical module 20.

As shown in FIGS. 1-3, the reading device 10 also comprises a printed circuit board or PCB 511 that, in the example illustrated here, is of the rigid-flexible type, and is particularly foldable in C form.

The printed circuit board 511 comprises a lower portion 512, an upper portion 513 and an intermediate portion 514 which is associated with the lower 512 and upper 513 portions by means of respective connectors 511a configured in such a way as to carry electrical signals from one portion 512, 513, 514 to another.

The intermediate portion 514 has a central hole 515 which is coaxial to the optical axis X.

The printed circuit board 511 is also housed within the box-shaped body 211, with the intermediate portion 514 in abutment against the front wall 315 of the cover 311.

The lower portion 512 of the PCB 511 serves as a support plate for the optical module 20 within the box-shaped body 211.

The lower portion 512 of the PCB 511 comprises, at a center line portion thereof, a sliding seat 520 extending parallel to the optical axis X and whose function is described hereinafter (FIG. 3). In the embodiment illustrated and described herein, the sliding seat 520 is defined by a slot that stretches along a direction parallel to the optical axis X.

The lower portion 512 of the PCB 511 also comprises, on opposing sides with respect to the sliding seat 520, respective locking elements 521 of the optical module 20 on the lower portion 512 of the PCB 511.

The free end portions of the lower and upper portions 512 and 513 of the PCB 511 are associated with the mask 411.

The reading device 10 may further comprise a mechanical actuator 50 that is arranged for allowing the focusing distance to be adjusted. This mechanical actuator 50 will be described with particular reference to FIG. 4, where it is illustrated without the other components of the reading device 10 with which it cooperates.

The mechanical actuator 50 comprises a gripping member 51 of the optical focusing group 20. In particular, the gripping member 51 comprises a pair of arms 52a, 52b made as one piece with the connecting arm 53.

The arms 52a, 52b are parallel to the optical axis X and extend from symmetrically opposite sides with respect to the optical axis X.

The connecting arm 53 extends perpendicularly to the optical axis X and has a hole 56 that is coaxial to optical axis X.

The arm 52a has a sliding projecting element 60 housed within the sliding seat 520 formed within the lower portion 512 of the PCB 511. Following an operation of the control element, the projecting element 60 slides within the sliding seat 520, guiding the axial movement of the gripping member 51, and therefore the optical focusing group 21.

As illustrated in FIGS. 1-3, the optical module 20 is arranged between the arms 52a and 52b, with the arm 52a being interposed between the optical module 20, the lower portion 512 of the PCB 511 and the arm 52b being interposed between the module 20 and the upper portion 513 of the PCB 511 and the connecting arm 53 being interposed between the optical module 20 and the intermediate portion 514 of the PCB 511.

The arms 52a and 52b are substantially C shaped and have, at the free end portions thereof, a fastening wall 55 at the end flange 22 of the optical focusing group 21. On the fastening wall 55 are formed threaded holes 55a.

The fastening wall 55 extends perpendicularly to the optical axis X.

The end flange 22 is pushed in axial abutment against the fastening wall 55 by the head 54a of a clamping screw 54 screwed into the threaded hole 55a.

The offset end portion of the arms 52a and 52b is made as one piece with the connecting arm 53. The latter defines a wall for coupling the arms 52a, 52b (and therefore the gripping member 51) to a control member 70 that controls the axial movement of the gripping member 51, and therefore the optical focusing group 21.

Again, with reference to the FIG. 4, the control member 70 comprises an adjustment screw 71 that is coaxial to the optical axis X.

As illustrated in FIG. 1, the adjustment screw 71 is inserted into the through hole 316 formed in the front wall 315 of the cover 311, passes through the through hole 515 formed within the intermediate portion 514 of the PCB 511 until in engagement with a threaded insert 72 firmly housed within the hole 56 formed in the connecting arm 53 of the gripping member 51. Therefore the threaded insert 72 is also coaxial to the optical axis X.

The rotation of the adjustment screw 71 within the threaded insert 72 around the optical axis X may allow for the axial movement of the gripping member 51 with respect to the optical module 20.

In the example illustrated, the hole 56 has an internal thread and the threaded insert 72 has an external thread that mates with that of the hole 56 and that is opposite to that of the adjustment screw 71. In this way, it is possible to screw the threaded insert 72 in a stable way in the connecting arm 53 without the undesirable risk of unscrewing the threaded insert 72 during the axial movement of the gripping member 51 as a result of the engagement between the adjustment screw 71 and the threaded insert 72.

The adjustment screw 71 comprises a head 71a arranged externally to the cover 311, and therefore externally to the external case 11.

The head 71a acts as a control element for the rotation of the adjustment screw 71 around the optical axis X.

Mounted upon the head 71a of the adjustment screw 71 there is a bezel 73 that is preferably graduated in such a way as to supply the user with a visual indication of the amount of rotation applied to the adjustment screw 71.

Arranged between the head 71a of the adjustment screw 71 and the front wall 315 of the cover 311 there is, in a state of axial torsion, an elastic sealing gasket 75.

The adjustment screw 71 comprises a shank 71b arranged internally to the external case 11 there being formed thereupon an annular groove 71c that houses a circlip 76. This circlip 76 is in axial abutment against the front wall 315 of the cover 311 and avoids, together with the elastic gasket 75, any eventual undesired relative axial movement between the adjustment screw 71 and the external case 11.

In operation, in order to adjust the focusing distance of the reading device 10, the user turns, preferably by means of a screwdriver, the head 71a of the screw 71, thus rotating the adjustment screw 71 within the threaded insert 72 and thereby producing an axial movement of the threaded insert 72 with respect to the adjustment screw 71. Given that the threaded insert is integral to the gripping member 51, the latter being integral to the optical focusing group 21, following rotation of the screw 71, axial movement occurs of the optical focusing group 21 by an amount proportional to the angle of rotation applied to the bezel 73.

The control member 70 described above can be used with any type of conventional optical module 20 having an optical focusing group 21 with an end flange 22.

Naturally, a person skilled in the art could make further changes and variations to the invention described above in order to satisfy specific and contingent application requirements, variations and modifications that nonetheless fall within the scope of protection as defined by the subsequent claims.

The invention claimed is:
1. A device for the acquisition of optical information, comprising an external case and, within the external case:
an optical module including a housing having a first end and a second end and comprising an image sensor therein:
an optical focusing group in optical alignment with the optical module and configured to collect a light beam for the image sensor, the optical focusing group having an optical axis;
a mechanical actuator associated with the optical focusing group and configured to move the optical focusing group along the optical axis, wherein the mechanical actuator comprises:
a gripping member including;
a connecting arm positioned proximate the first end of the optical module and extending perpendicularly to the optical axis; and
a pair of extending arms connected to the connecting arm and extending parallel to the optical axis on opposite external sides of the optical module from the first end to the second end of the optical module; and
a control member coupled to the gripping member via a hole in the connecting arm that is coaxially aligned with the optical axis of the optical focusing group, the control member operable to:
rotate around the optical axis from the outside of the external case to axially move the optical focusing group relative to the image sensor via movement of the gripping member in a direction parallel to the optical axis.

2. A device according to claim 1, wherein the arms extend around the external sides of the optical module symmetrically with respect to the optical axis.

3. A device according to claim 1, wherein each of the arms is substantially C-shaped with a free end portion extending around the second end of the optical module, and a connected end portion extending around the first end portion to connect with the connecting; arm.

4. A device according to claim 3, wherein a fastening wall is held in axial abutment against an end flange of the optical focusing group by a clamping screw that is screwed into a threaded hole formed in the fastening wall and having a head in abutment against the end flange from opposite side with respect to the fastening wall.

5. A device according to claim 4, wherein the fastening walls extend substantially perpendicularly to the optical axis.

6. A device according to claim 3, wherein the pair of the arms and the connecting arm are made as one piece.

7. A device according to claim 1, wherein the external case comprises, therewithin, a PCB that supports the optical and module, wherein one of the arms is interposed between the optical module and the PCB.

8. A device according to claim 1, wherein the control member comprises:
a threaded insert integral the gripping member within the hole in the connecting arm and arranged coaxially the optical axis;
an adjustment screw engaged with the threaded insert; and
a control element configured to rotate the adjustment screw, wherein the control element is integral to the adjustment screw and is arranged externally to the external case.

9. A device according to claim 8, wherein the rotational control member is arranged coaxially to the optical axis.

10. A device according to claim 2, wherein each of the arms is substantially C-shaped with a free end portion extending around the second end of the optical module, and a connected end portion extending around the first end portion to connect with the connecting arm.

11. A device according to claim 7, wherein the control member comprises:
a threaded insert integral to the gripping member within the hole in the connecting arm and arranged coaxially to the optical axis;

an adjustment screw engaged with the threaded insert; and
a control element configured to rotate the adjustment screw, wherein the control element is integral to the adjustment screw and is arranged externally to the external case.

12. A device according to claim 8, further comprising a bezel mounted on a head of the adjustment screw.

13. A device according to claim 7, wherein:
one of the extending arms includes a sliding projecting element on an outer side thereof;
the PCB includes a sliding seat formed therein extending parallel to the optical axis; and
the sliding projection element fits into the sliding seat of the PCB to guide axial movement of the gripping member when activated by the control element.

14. A device according to claim 13, wherein the PCB further comprises at least one locking element to fix the optical module in place with the PCB.

15. A device according to claim 13, wherein the PCB is foldable in a C form with a hole in an intermediate portion that coaxially aligns with the hole in the connecting arm through which the adjustment screw passes to engage with the connecting arm of the gripping member.

16. A device according to claim 1, wherein the optical module includes light sources configured to illuminate an object with an optical code thereon.

17. A device according to claim 15, wherein the optical focusing group is interposed between the light sources.

18. A device according to claim 16, further comprising a reading window disposed perpendicular to the optical axis and in an exit path of the illumination of the light sources and an return path of the light beam from the optical code.

19. A device according to claim 3, wherein the optical focusing group includes an end flange in abutment with the free end portion of each arm of the gripping member.

20. A device according to claim 1, wherein the device is selected from the group consisting of a scanner, a vision sensor, and a smart camera.

* * * * *